US009998482B2

(12) United States Patent
Ionescu et al.

(10) Patent No.: US 9,998,482 B2
(45) Date of Patent: Jun. 12, 2018

(54) AUTOMATED NETWORK INTERFACE ATTACK RESPONSE

(71) Applicant: International Business Machines Corporation, Armonk, NY (US)

(72) Inventors: Paul Ionescu, Kanata (CA); Iosif V. Onut, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 14/858,328

(22) Filed: Sep. 18, 2015

(65) Prior Publication Data

US 2017/0085579 A1     Mar. 23, 2017

(51) Int. Cl.
G06F 12/14    (2006.01)
G06F 11/30    (2006.01)
H04L 29/06    (2006.01)

(52) U.S. Cl.
CPC ...... H04L 63/1416 (2013.01); H04L 63/1433 (2013.01)

(58) Field of Classification Search
CPC .................. H04L 63/1416; H04L 63/1433
USPC ..................................... 726/23, 25; 713/188
See application file for complete search history.

(56) References Cited

U.S. PATENT DOCUMENTS

| 5,796,942 | A | 8/1998 | Esbensen |
| 8,056,130 | B1 | 11/2011 | Njemanze et al. |
| 8,127,353 | B2 | 2/2012 | Rittermann |
| 8,423,894 | B2 | 4/2013 | Bhattacharya et al. |
| 2003/0204632 | A1 | 10/2003 | Willebeek-LeMair et al. |
| 2007/0169194 | A1* | 7/2007 | Church .................. G06F 21/552 726/23 |
| 2010/0071054 | A1 | 3/2010 | Hart |
| 2011/0035784 | A1* | 2/2011 | Jakobsson ........... H04L 63/1466 726/2 |
| 2011/0258165 | A1* | 10/2011 | Jung ..................... G06F 21/568 707/687 |
| 2012/0159595 | A1* | 6/2012 | Barham .............. H04L 67/1095 726/7 |
| 2014/0123295 | A1 | 5/2014 | Kuykendall et al. |

(Continued)

FOREIGN PATENT DOCUMENTS

EP     2525546 A1     11/2012

OTHER PUBLICATIONS

Anonymous, "System, Method and Apparatus for Interactive Security Analysis", IP.com Prior Art Database Technical Disclosure. IP.com No. 000208355, IP.com Electronic Publication: Jul. 4, 2011. 4 pages.

(Continued)

*Primary Examiner* — Aravind K Moorthy
(74) *Attorney, Agent, or Firm* — Jared C. Chaney

(57) ABSTRACT

An attack upon a web interface is detected in real-time. The web interface is one of many web interfaces across many ports across many computer systems within a network. Data on the attack is gathered. The attack data includes traffic data. Variants of the attack are determined based on data of the attack. The variants are selected from a predetermined set of attack variants. The attacked interface is scanned with the selected attack variants. The web interface is identified as vulnerable to at least one variant of the attack. In response to this identification, the attack is responded to without human intervention.

20 Claims, 3 Drawing Sheets

(56) References Cited

U.S. PATENT DOCUMENTS

2015/0248559 A1* 9/2015 Madou ................ H04L 63/1433
726/25
2016/0285894 A1* 9/2016 Nelms ................... H04L 63/145

OTHER PUBLICATIONS

Gandhi, et al., "Detecting and preventing attacks using network intrusion detection systems", International Journal of Computer Science and Security, vol. (2) : Issue (1). pp. 49-60.

Gu, et al., "BotHunter: detecting malware infection through IDS-driven dialog correlation", 'SS'07 Proceedings of 16th USENIX Security Symposium on USENIX Security Symposium. Article No. 12. USENIX Association Berkeley, CA, USA. © 2007 ISBN: 111-333-5555-77-9. Last printed Jul. 9, 2015, 3:20 PM. 2 pages. http://dl.acm.org/citation.cfm?id=1362903.1362915&coll=DL&dl=GUIDE&CFID=714069201&CFTOKEN=30738397.

Liu, et al., "An adaptive architecture of applying vulnerability analysis to IDS alerts", ICAIT '08 Proceedings of the 2008 International Conference on Advanced Infocomm Technology. Article No. 78. ISBN: 978-1-60558-088-3 DOI: 10.1145/1509315.1509393. ACM New York, NY, USA © 2008 Last Printed Jul. 9, 2015, 3:16 PM. 2 pages. http://dl.acm.org/citation.cfm?id=1509315.1509393&coll=DL&dl=GUIDE&CFID=714069950&CFTOKEN=93029767.

Moriarty, "Real-time Inter-network Defense (RID)", Internet Engineering Task Force (IETF). EMC, Apr. 2012. ISSN: 2070-1721 pp. 1-84.

* cited by examiner

AUTOMATED NETWORK INTERFACE ATTACK RESPONSE

BACKGROUND

Web applications may have security vulnerabilities that may be exploited by third parties. Third parties may attempt to exploit such vulnerabilities by attacks such as cross site scripting or SQL injection. Modern web application security scanners are programs which can identify potential security vulnerabilities in web applications. Web application scanners may not have access to the source code of a web application, but may instead detect vulnerabilities by performing actual attacks on a web application.

SUMMARY

Embodiments of the disclosure provide a method, system, and computer program product for automating a response to an attack on web interfaces. An attack upon a web interface may be detected. The attack may be detected in real-time. The web interface may be one of many web interfaces across many ports across many computer systems within a network. Data on the attack may be gathered. The attack data may include traffic data. Variants of the attack may be determined based on data of the attack. The variants may be selected from a predetermined set of attack variants. The attacked interface may be scanned with the selected attack variants. The web interface may be identified as vulnerable to at least one variant of the attack. In response to this identification, the attack may be autonomously responded to without human intervention.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
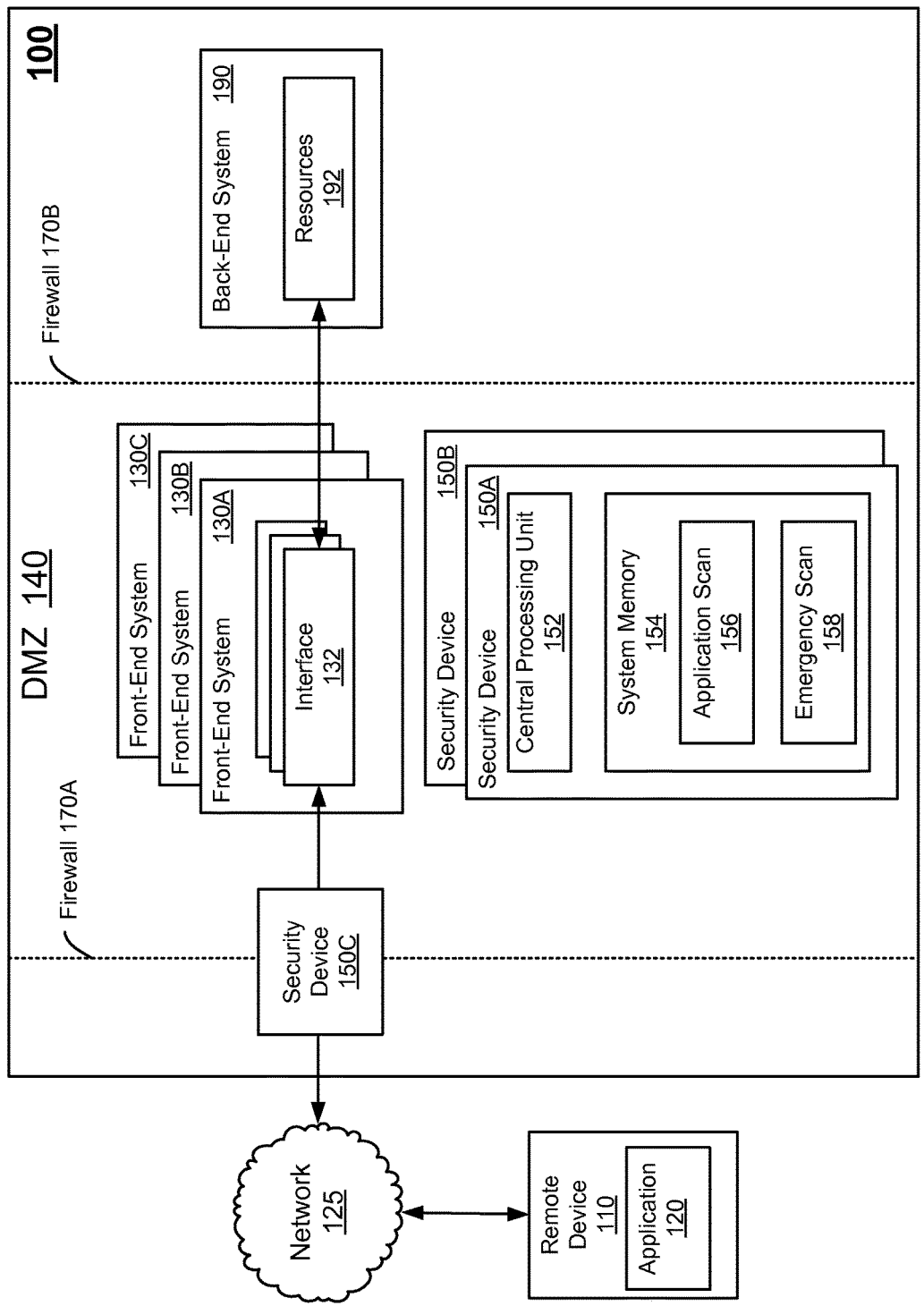
FIG. 1 is an illustration of a computing architecture which includes a computing device for automating a response to an attack on application interfaces, according to embodiments.

While embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to various embodiments of a system and method for automating a response to an attack on a computing system. A security application may detect an attack on one or more web interfaces. The security application may gather information on the attack. The information may include network traffic details and the type(s) of attack used against the web interfaces. Using this information, a customized scan may be created to assess the risk of the attack. The web interface may be scanned with the customized scan. In instances, the web interface may be identified as vulnerable to a variant of the attack. In response to this identification, an automated response to the attack may be made to address the attack without human intervention. While the present disclosure is not necessarily limited to such applications, various aspects of the disclosure may be appreciated through a discussion of various examples using this context. Examples and example values discussed herein are provided by way of example only and are not to be construed as limiting.

In instances, web application vulnerability scanners may scan interfaces with simulated attacks to identify security vulnerabilities. A web application vulnerability scanner may scan a plurality of systems, wherein each system may include a plurality of interfaces, and each interface may include a plurality of potential vulnerable elements. A web application vulnerability scanner may simulate attacks with known attack variants. In instances, the high-level nature of the simulated attacks may return false positives, signaling a vulnerability which is unrealistic. The attack variants which are known or tested may increase or change over time. Testing every potentially vulnerable element of every interface of every system after every attack variant change or update may require a prohibitively high cost in terms of resources. Interfaces of web applications may be attacked by third parties. Network security devices may detect the attack. In instances, a third party attack may exploit an element of an interface which has not been tested since attack variants have changed.

Aspects of the disclosure are directed towards automatically responding to an attack upon a web application interface. The attack may be detected by a network security device. The attack may be analyzed to gather data of the attack, such as the interface which was attacked, the type of attack which was used (e.g., a cross site scripting attack or a SQL (structured query language) insertion attack), the actual payload of the attack, and the originating network address (e.g., IP address) of the attack. Using this data, a customized scan may be determined to assess the potential danger of the attack. The customized scan may only scan a small portion of interfaces using a small number of the variants which are available to the scanner to reduce the time and resources necessary for the scan. For example, the customized scan may include the interface(s) which were attacked using known variants of the attack. By paring down the subject of the scan, the scan may be completed faster, allowing for a quicker response. The scan may illuminate a vulnerability of one or more interfaces. In response to this determination of vulnerability, automated actions (e.g., actions without human intervention) may be taken to address the attack, such as blocking an IP address.

FIG. 1 depicts a high-level block diagram of a computer architecture 100 for automated response to attacks. The computer architecture 100 may connect through the internet to remote devices 110. The components of the various embodiments disclosed herein apply equally to any appropriate computing system. The components of the example computer architecture 100 shown in FIG. 1 include a demilitarized zone (DMZ) with one or more security devices 150A, 150B, 150C and one or more front-end systems 130 which may include one or more application interfaces 132.

The architecture also includes a back-end system 190 which includes resources 192 and is connected to one or more of the front-end systems 130.

A third party may use a remote device 110 to communicate with the computer architecture 100. The third party may interact with one or more interfaces 132 on one or more front-end systems 130A, 130B, 130C. The third party may access the interface 132 through a network. 125. In certain embodiments the network 125 can be implemented using any number of any suitable communications topologies (e.g., wide area network (WAN), local area network (LAN), Internet, Intranet, hardwire, wireless link, etc.). In certain embodiments, the network 125 can be implemented within a cloud computer system, or using one or more cloud computing services. Consistent with various embodiments, a cloud computer system can include a network-based, distributed data processing system that provides one or more cloud computing services. In certain embodiments, a cloud computer system can include many computers, hundreds or thousands of them, disposed within one or more data centers and configured to share resources over the network. However, it is to be understood that cloud computer systems are not limited to those which include hundreds or thousands of computers and can include few than hundreds of computers.

The remote device 110 may be a computing device capable of network communication, such as a desktop computer or laptop computer, used by a third party to process/execute an application 120. The application 120 may be a software application (e.g., web browser) that enables a user to access a resource from a back-end system 190. The third party may use the application 120 to communicate with one or more of the front-end systems 130 and generate payloads/requests/commands for a desired resource such as a web page through an interface 132.

Communication between the remote device 110 and a front-end system 130 may need to pass through a first firewall 170A. The first firewall 170A may be provided by a computer device that hosts one or more front-end systems 130, or it may be provided by separate computing devices such as the security devices 150C. Different number of firewalls may be established throughout the computer architecture 100. Firewalls 170 may be configured to restrict protocols, port ranges, request content, users, or other similar aspects of communication.

The front-end system 130 may be executed by or be a component of a computing system such as a desktop computer, laptop computer or server. The front-end systems 130 may include interfaces 132 for accessing the resources of the back-end system 190. In one embodiment, the interfaces 132 can be a web based interface provided by a web server or similar application. The interfaces 132 may allow remote devices 110 to access resources 192. The interfaces 132 may receive requests for resources from the applications 120 on remote device 110 and service these requests to the back-end system 190. In some embodiments, resources 192 are only stored in the back-end system 190.

The front-end systems 130 may be separated from the back-end system 190 by an additional firewall 170B. In some embodiments a second firewall 170B may be provided by the back end system 190, though in other embodiments the second firewall 170B may be provided by a separate component situated between the front and the back-end system 190 or provided by a device in the DMZ 140 such as the security device 150C. Using two firewalls 170 to isolate front-end interfaces with back-end resources creates a demilitarized zone (DMZ) 140. The front-end system 130 in the DMZ 140 provides indirect access to resources 192 of the back-end system 190.

In some embodiments, the security device 150C may differ from security devices 150A and 150B in regards to the security functionality/applications hosted on said device(s) (e.g., security device 150A hosts an application scanner 156, while security device 150B hosts a first firewall 170B, while security device 150C hosts a second firewall 170A). In other embodiments, numerous security features/applications or all security features/applications may be stored on a singular security device 150. The illustrative components of security device 150A shown in FIG. 1 are provided for purposes of explanation only. It is to be understood that other components can be included in addition to or in lieu of those shown in other security devices 150B, 150C. Furthermore, it is to be understood that the components of security devices 150B and 150C may be different than those shown with respect to security device 150A.

The back-end system 190 may include a set of resources 192, and can be provided by any type of computing device as a component thereof or by executing or otherwise providing the constituent components of the back-end system 190. The back-end system 190 can be a single computing device or can be distributed over a set of computing devices.

A malicious programmer may attempt to gain access to the back-end system 190 by using a remote device 110 to attack one or more interfaces 132. By attacking one or more interfaces 132, the malicious programmer may attempt to find a vulnerability to exploit. In instances, a malicious programmer may then attempt to gain access to resources 192 of the back-end system 190. From the remote device 110, the malicious programmer may utilize one or more types of attack on the one or more interfaces 132, such as cross site scripting, SQL injection, path disclosure, denial of service, code execution, memory corruption, cross site request forgery, information disclosure, arbitrary file, local file inclusion, or other types of web interface attacks.

In some embodiments, one or more security devices 150 may reside in the DMZ 140 to assess vulnerabilities and detect breeches. In certain embodiments, security devices 150, such as a security device 150A which includes application scanning functionality, may reside outside of the DMZ. A security device 150 may have network security functions which can detect attacks. In some embodiments, such intrusion detection functionality may reside on the security device 150C between the external network 125 and front end systems 130 to better detect/intercept attacks. A security device 150C residing between the external network 125 and front end systems 130 may include other network protection appliances as well. Security devices 150 may include an application scan function 156 to assess interfaces 132 of systems 130 for vulnerabilities. The security devices 150 may include an emergency scan function 158 to provide an emergency scan in the case of an attack to autonomously assess danger and immediately respond appropriately.

The security devices 150 may contain one or more general-purpose programmable central processing units (CPUs) 152, herein generically referred to as a processor 152. In some embodiments, the security devices 150 may contain multiple processors; however, in certain embodiments, the security devices 150 may alternatively be a single CPU system. Each processor 152 executes instructions—such as the instructions from the emergency scan function 158 to perform the operations described with respect to method 200—stored in the memory 154.

In some embodiments, the memory 154 may include a random-access semiconductor memory, storage device, or storage medium (either volatile or non-volatile) for storing or encoding data and programs. The memory 154 can include stored data. In certain embodiments, the memory 154 represents the entire virtual memory of the security devices 150, and may also include the virtual memory of other computer systems coupled to the security devices 150 or connected via the computer architecture 100.

The memory 154 may store all or a portion of the various programs, modules and data structures for processing data transfers as discussed herein. For instance, the memory 154 may include the application scan function which scans for vulnerabilities across the computer architecture 100. The memory 154 may also include the emergency scan function 158. In this illustrative embodiment, the emergency scan function 158 includes instructions or statements that execute on the processor 152 or instructions or statements that are interpreted by instructions or statements that execute on the processor 152 to carry out functions (e.g., the operations of method 200) as further described below. However, in other embodiments, the emergency scan function 158 is implemented in hardware via semiconductor devices, chips, logical gates, circuits, circuit cards, and/or other physical hardware devices (e.g., ASIC or FPGA) in lieu of, or in addition to, a processor-based system.

FIG. 1 depicts several example components of the computer architecture 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
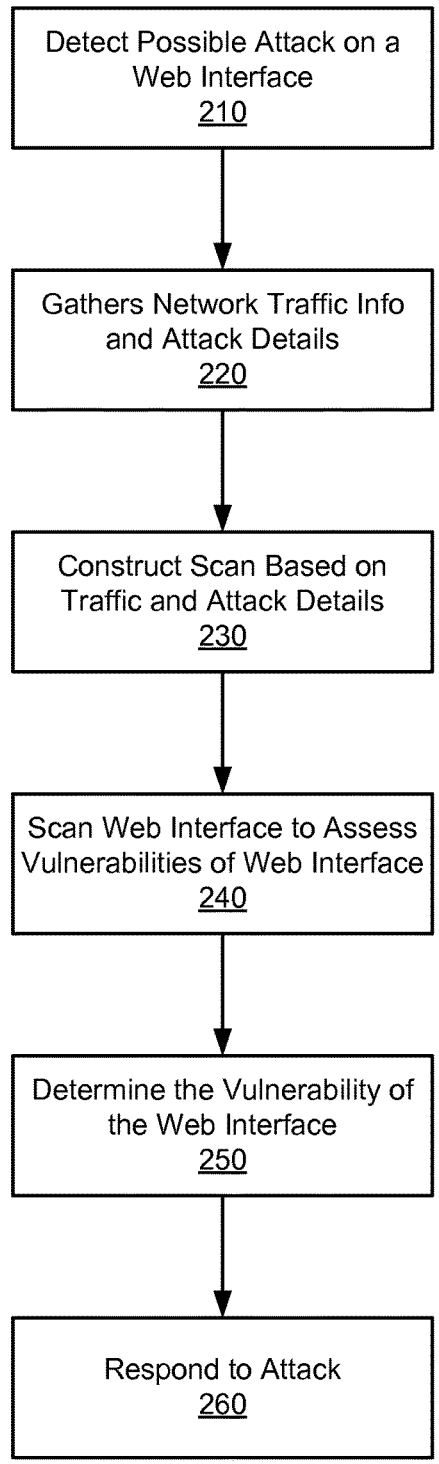
FIG. 2 is a method of automating a response to an attack on web interfaces, according to embodiments.

FIG. 2 is a flowchart illustrating a method 200 for automating a response to an attack on web interfaces. The method 200 may be enacted by a computing device (e.g., server) in the DMZ of a computing architecture. Said computing device may include a number of security systems, such as a web application security scanner system (e.g., IBM Security AppScan) or a security information and event management (SIEM) system (e.g., IBM Security QRadar SIEM). In some embodiments, a security controller may coordinate functions of these security systems to execute method 200 on the computing device. The security controller may coordinate these functions to respond to a malicious third party which is attempting to exploit a vulnerability of an interface. The security controller may complete method 200 autonomously (e.g., without human intervention) in real-time to mitigate danger of the attack. The autonomous response of method 200 may include scanning interfaces of a specific web application or scanning a host/port, though for illustrative purposes scanning interfaces is predominantly used in the discussion of method 200. Method 200 is not to be construed as limiting the scan to interfaces. In some embodiments, the security controller may use a web application security scanner system to complete the scan of the selected interfaces/ports. The visual arrangement of blocks in the flowchart of FIG. 2 is not to be construed as limiting the order in which the individual acts/operations may be performed, as certain embodiments may perform the operations of FIG. 2 in alternative orders.

At block 210 an attack is detected. In some embodiments, an attack is an act by a third party with the aim of purposefully exploiting a vulnerability in an application interface. The security controller may detect the attack in real-time, which is to say the attack may be detected immediately after or nearly immediately after the attack occurred. The security controller may detect the attack through the identification of a certain type of error (e.g., a database (DB) error), or an identification of a certain type of error occurring a certain number of times, or an identification of an error happening after an unusually high amount of traffic between a particular IP address and a web interface, or an identification of an unusually high amount of activity between the IP address and the interface with one part of the activity including a known attack variant. An attack variant may be one specific method of exploiting a web interface which is part of a larger umbrella of attacks, such as SQL injection. In some embodiments, the attack may be detected by a number of known techniques. In certain embodiments, the security controller may use a SIEM component of the system to detect the attack.

The attack may include a payload or command sent to one or more interfaces (e.g., a web page). In some embodiments, the attack may include many payloads or commands. For example, a SQL injection attack may be detected. The attack may be on a single interface which includes an element which allows a username input and an element which allows a password input. The attack may include unconventional characters (e.g., a set of characters which the interface was not programmed to process) in one or both fields, such as quotation marks as a username. The attack may result in a database error, which may signal that the interface was not programmed to process the attack. In other embodiments, the attack may include a single attempted SQL injection into multiple interfaces, multiple SQL injections into a single interface, or multiple SQL injections into multiple interfaces. Other embodiments, using other types of attacks, are also possible.

At block 220 data on the attack is gathered. In some embodiments, the security controller may use a SIEM component to gather the data. The data may include traffic data. Traffic data may include the originating address of the attack (e.g., the IP address which the attack came from), the specific port which was attacked, and the uniform resource locator (URL) of the attacked interface. The data may also include the actual input(s) of the attack (e.g., the payloads which constituted the attack), such as, but not limited to, the values/characters of the http request, or cookies associated with the attacking entity. The cookies may identify other attempted attacks of the third party. In this way the security controller may "steal" the session of the third party, which may expedite efforts to thwart the attack. In some embodiments, the attacked port and the IP address may be sufficient data for the successful completion of method 200. However, collecting other data such as the URL and the cookies in addition to the port and IP address may allow for a faster completion of method 200 in some embodiments.

For example, after detecting an attack on an interface with a username and password input, data may be gathered. The security controller may gather data which captures the totality of the threat, including, for example, the IP address of the attacker, some attempted SQL insertions, the port which was attacked, and/or the URL of the interface. In some embodiments, the security controller may also gather data relating to the last time the interface was scanned and the attack variants the interface was scanned with.

At block 230 a customized scan is created. The customized scan may be created based off of the web interfaces which were attacked and the data which was gathered in block 220. The customized scan may include a set of web interfaces which will be scanned and a set of attack variants the set of web interfaces will be scanned with. The security controller may construct the customized scan to include as few components as possible while checking all possible vulnerabilities related to the attack, to decrease the duration of the scan and therein expedite the possible identification of said vulnerabilities.

In some embodiments, the attack variants of the customized scan may come from a master set of predetermined attack variants. The master set may include correlations between the variants and other variables, such as cross-references between types of attack variant (e.g., cross site scripting or SQL injection) and payload data of the attack variant (e.g., http requests). Within the master set of attack variants, different payloads may relate to each other. The payloads—and therefore the variants—may relate to each other if the payloads would likely be attempted in the same attack on the same interface.

For example, one attack variant may be of type SQL insertion and of payload data 'sleep(1000)' (e.g., inserting a second-long delay into an interface). A related attack variant may also be type SQL injection and include the payload data ' ' (e.g., a blank value). The security controller may identify attack variants which correlate with the type and payload data used when constructing the scan. For example, if the attack included an SQL insertion of ' ', the attack variant may identify an SQL insertion of 'sleep(1000)'.

Customized scans may include these related variants to create scans which may predict (and therein curb) successful imminent attacks. For example, if a malicious third party submitted a first payload, the controller may detect the first payload, use the first payload to predict what the third party may submit for a second payload, scan the interface with the second payload, identify a vulnerability, and block an IP address of the third party, theoretically before the third party identified the vulnerability itself.

In some embodiments, the set of web interfaces of the constructed scan may include interfaces which are related to the attacked web interface. For example, if a new user registration interface for an application is attacked, both a returning user login interface and a returning user password retrieval interface for the same application may be included in the constructed scan. In some embodiments, the web interfaces within the customized scan may include interfaces which have not been scanned before. In such embodiments, the controller may keep/have access to records on when the code behind interfaces has been patched, and may count a web interface which undergoes a patch as not scanned (until it has been scanned with the respective variants).

In other embodiments, different interfaces may have been scanned with different variants, and as a result the constructed scan may match up interfaces and variants which have never been paired. For example, a security controller may identify three different related interfaces and 30 attack variants which correspond with the attack. The first interface may have been previously scanned with the first 10 attack variants since its most recent patch, the second interface may have been previously scanned with the next 10 attack variants since its most recent patch, and the third interface may have been scanned with the final 10 attack variants since its most recent patch. The security controller may therein determine a customized scan which includes the final 20 variants for the first interface, the first and last ten variants for the second interface, and the first 20 variants for the third interface.

At block 240 the attacked interface is scanned. The interface may be scanned in a manner consistent with the attack to evaluate the danger of the attack. For example, if the interface was attacked with an SQL injection, the interface may be scanned with http requests with different payloads. The scanning may be done by a number of known techniques. A security controller may use a web application security scanner to scan the interface.

As discussed herein, if the scanner has data on the URL which was attacked, the process of scanning may be expedited by scanning exactly to that URL and potentially only that URL. Otherwise, if at block 220 only a port which was attacked was gathered, the scan may use the attack variants upon every URL within that port. Alternatively, if a URL was gathered, the scan may only deploy the attack variants against the URL, in some embodiments, allowing for a quicker scan and therefore a faster response to the attack.

At block 250 the vulnerability of the web interface is determined. In some embodiments, at least one attack variant from the scan at block 240 will result in a database error or some other variety of error or flaw (e.g., a process being delayed with a sleep command). In such embodiments, the security controller may determine the web interface to be vulnerable. Put differently, a web interface may be determined to have a vulnerability when said web interface is susceptible to one or more errors in response to the attack or variants of the attack as described above. In other embodiments, a user may have the ability to configure what constitutes a vulnerable web interface. In instances, the security controller may determine that no web interface is vulnerable.

At block 260 the attack is responded to. Where the attack did not correlate with a vulnerability, a security controller may simply log the attack and associated scan. By not blocking the address of the attack, the security controller may see performance benefits. In other embodiments where the attack did not correlate with a vulnerability, the IP address which instigated the attack may be blocked. In yet another embodiment where the attack did not correlate with a vulnerability, the IP address which instigated the attack may be tracked, allowing the activity associated with that address to be recorded.

In some embodiments, a security controller may determine at block 250 that the web interface is vulnerable to at least one variant of the attack. As such, the security controller may have the confidence that it can and should respond to the attack at block 260. An attack response may include blocking the IP address. The IP address may be blocked autonomously and immediately, such that no human user needs to confirm the action and no further system verification is necessary.

Figure 3:
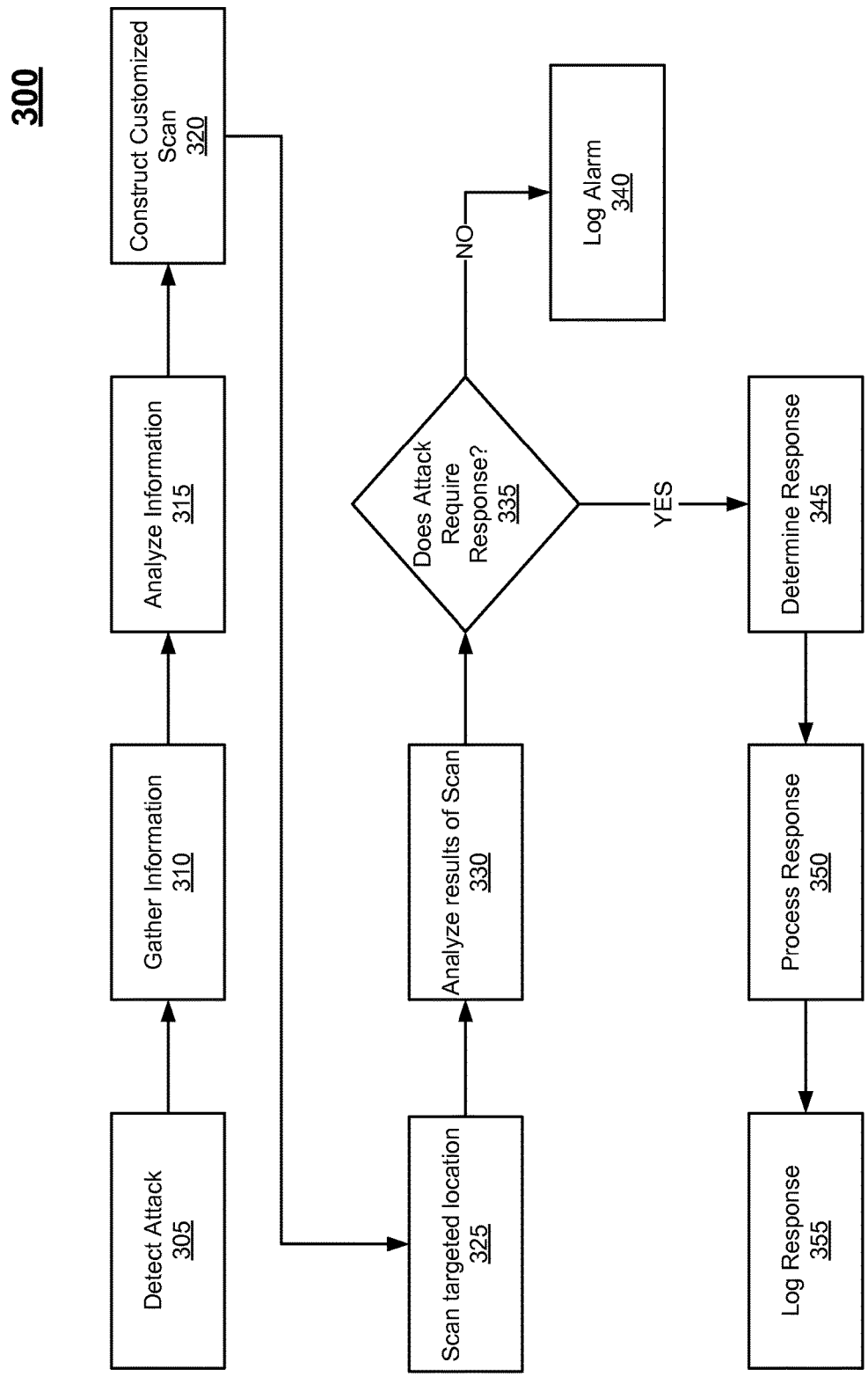
FIG. 3 is a flowchart of automating a response to an attack on web interfaces, according to embodiments.

FIG. 3 depicts a flowchart 300 of autonomously responding to an attack upon an interface. Each operation of flowchart 300 may be processed by a computing system with no required intervention or input from a human. At block 305 an attack is detected. The attack may be upon an interface of the computing system by a third party system. At block 310 a security controller of the system may gather information on the attack. The information may include how the interface was attacked and what the network traffic consisted of during the attack. The security controller may analyze that information at block 315. Analyzing the information may include determining the source of the attack, the likely target(s) of the attack, and the likely means of attacking the target(s) (e.g., what payloads may be delivered with what type of attack).

With this analysis, the security controller may construct a scan for the interface at block 320. The scan may be customized to determine the vulnerability of the system to the attack. At block 325 the likely targets/interfaces may be scanned per the customized scan. At block 330 the security controller may analyze the results of the scan. Analyzing the results may include determining whether or not the computing system is vulnerable to the attack. After analyzing the results, the security controller may decide at block 335 whether or not the event requires a response. If the attack does not warrant a response (e.g., if the interface is not vulnerable to variants of the attack), at block 340 the system may log an alarm in response to the detected attack. If the attack does warrant a response at block 345 the security controller may determine what that response will be. The response may include blocking the IP address of the original attacker or tracking the attacking IP address. At block 350 the response is processed and carried out. At block 355 the attack and response is logged.

The functionality outlined in the discussions herein regarding FIG. 1, FIG. 2, and FIG. 3 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   detecting, in real-time, an attack on a web interface of a computing system having a plurality of web interfaces, wherein the web interface includes a plurality of potential vulnerable elements and wherein each of the web interfaces includes a plurality of potential vulnerable elements, wherein the detecting comprises identifying a database error signaling that the web interface was not programmed to process the attack;
   gathering data on the attack;
   determining variants of the attack based on data of the attack, wherein the variants are a subset of a predetermined set of attack variants;
   scanning, based on the attack, the web interface with the variants of the attack;
   determining vulnerability of the web interface to the variants of the attack; and
   responding to the attack without human intervention based on the determined vulnerability of the web interface to the variants of the attack.

2. The method of claim 1, wherein the data includes a type of the attack and payload data of the attack.

3. The method of claim 2, wherein determining variants of the attack further comprises:
   cross-referencing the type of attack and the payload data of the attack against the predetermined set of attack variants, wherein the predetermined set of attack variants includes correlations between the attack variants, types of attacks, and payload data of attacks; and
   identifying the variants of the attack as correlating with the type of attack and the payload data of the attack.

4. The method of claim 3, further comprising:
   determining that the web interface has been previously scanned with one or more variants of the predetermined set of attack variants; and
   wherein the variants of the attack do not include the one or more variants.

5. The method of claim 1,
   wherein the data includes an originating network address of the attack and
   wherein responding to the attack further comprises blocking the originating network address of the attack.

6. The method of claim 1,
   wherein the data includes cookies of a client which executed the attack and
   wherein determining the variants of the attack comprises determining the variants of the attack based on the cookies.

7. The method of claim 1, further comprising:
   detecting a second attack on the web interface;
   gathering data on the second attack;
   determining variants of the second attack based on data of the second attack;
   scanning the web interface with variants of the second attack;
   determining vulnerability of the web interface to the variants of the second attack; and
   logging the second attack in response to determining that the web interface is not vulnerable to the second attack.

8. The method of claim 1, wherein scanning the web interface with the variants of the attack comprises scanning the web interface with the variants of the attack in response to determining that the web interface has not been previously scanned with the variants of the attack.

9. The method of claim 1, further comprising:
   determining a subset of the plurality of web interfaces which correlate to the attacked web interface and which have not been previously scanned with the variants of the attack; and
   scanning the subset of the plurality of web interfaces with the variants of the attack.

10. A computer system comprising:
    a memory; and
    one or more processing circuits communicatively coupled to the memory, wherein the one or more processing circuits are configured to
    detect, in real-time, an attack on a web interface of a computing system having a plurality of web interfaces, wherein the web interface includes a plurality of potential vulnerable elements and wherein each of the web interfaces includes a plurality of potential vulnerable elements, by identifying a database error signaling that the web interface was not programmed to process the attack,
    gather data on the attack,
    determine variants of the attack based on data of the attack, wherein the variants are a subset of a predetermined set of attack variants,
    scan, based on the attack, the web interface with the variants of the attack,
    determine vulnerability of the web interface to the variants of the attack, and
    respond to the attack without human intervention based on the determined vulnerability of the web interface to the variants of the attack.

11. The computer system of claim 10,
    wherein the data includes a type of the attack and payload data of the attack and wherein the one or more processing circuits are configured to determine the variants of the attack by being further configured to
cross-reference the type of attack and the payload data of the attack against the predetermined set of attack variants, wherein the predetermined set of attack variants includes correlations between the attack variants, types of attacks, and payload data of attacks, and
identify the variants of the attack as correlating with the type of attack and the payload data of the attack.

12. The computer system of claim 11, wherein the one or more processing circuits are further configured to:
determine that the web interface has been previously scanned with one or more variants of the predetermined set of attack variants; and
wherein the variants of the attack do not include the one or more variants.

13. The computer system of claim 10, wherein the computing system resides in a demilitarized zone (DMZ) of a computing network.

14. The computer system of claim 10, wherein the one or more processing circuits are further configured to:
detect a second attack on the web interface;
gather data on the second attack;
determine variants of the second attack based on data of the second attack;
scan the web interface with variants of the second attack;
determine vulnerability of the web interface to the variants of the second attack; and
log the second attack in response to determining that the web interface is not vulnerable to the second attack.

15. The computer system of claim 14, wherein the one or more processing circuits are further configured to:
determine a subset of the plurality of web interfaces which correlate to the attacked web interface and which have not been previously scanned with the variants of the attack; and
scan the subset of the plurality of web interfaces with the variants of the attack.

16. A computer program product comprising a computer readable storage medium having program instructions embodied therewith, the program instructions executable by a computer processor to cause the computer processor to:
detect, in real-time, an attack on a web interface of a computing system having a plurality of web interfaces, wherein the web interface includes a plurality of potential vulnerable elements and wherein each of the web interfaces includes a plurality of potential vulnerable elements, by identifying a database error signaling that the web interface was not programmed to process the attack;
gather data on the attack;
determine variants of the attack based on data of the attack, wherein the variants are a subset of a predetermined set of attack variants;
scan, based on the attack, the web interface with the variants of the attack;
determine vulnerability of the web interface to the variants of the attack; and
respond to the attack without human intervention based on the determined vulnerability of the web interface to the variants of the attack.

17. The computer program product of claim 16, wherein the data includes a type of the attack and payload data of the attack and
wherein the computer program product comprises program instructions regarding determining the variants of the attack, the program instructions regarding determining the variants of the attack executable by the computer processor, to cause the computer processor to
cross-reference the type of attack and the payload data of the attack against the predetermined set of attack variants, wherein the predetermined set of attack variants includes correlations between the attack variants, types of attacks, and payload data of attacks, and
identify the variants of the attack as correlating with the type of attack and the payload data of the attack.

18. The computer program product of claim 17, the computer program product further comprising program instructions executable by the computer processor to cause the computer processor to
determine that the web interface has been previously scanned with one or more variants of the predetermined set of attack variants,
wherein the variants of the attack do not include the one or more variants.

19. The computer program product of claim 16, the computer program product further comprising program instructions executable by the computer processor to cause the computer processor to:
detect a second attack on the web interface;
gather data on the second attack;
determine variants of the second attack based on data of the second attack;
scan the web interface with variants of the second attack;
determine vulnerability of the web interface to the variants of the second attack; and
log the second attack in response to determining that the web interface is not vulnerable to the second attack.

20. The computer program product of claim 16, wherein the computer program product further comprises program instructions for scanning the web interface with the variants of the executable by the computer processor to cause the computer processor to
scan the web interface with the variants of the attack in response to determining that the web interface has not been previously scanned with the variants of the attack.

* * * * *